US009983223B2

(12) United States Patent
Marsh

(10) Patent No.: US 9,983,223 B2
(45) Date of Patent: May 29, 2018

(54) ELECTROMAGNETIC BOAT SPEEDOMETER HAVING BOUNDARY LAYER VELOCITY COMPENSATION

(71) Applicant: BrickHouse Innovations, LLC, Frederick, MD (US)

(72) Inventor: Lawrence B. Marsh, Frederick, MD (US)

(73) Assignee: Brickhouse Innovations, LLC, Frederick, MD (US)

( * ) Notice: Subject to any disclaimer, the term of this patent is extended or adjusted under 35 U.S.C. 154(b) by 178 days.

(21) Appl. No.: 14/469,067

(22) Filed: Aug. 26, 2014

(65) Prior Publication Data

US 2016/0061856 A1    Mar. 3, 2016

(51) Int. Cl.
*G01P 3/50*    (2006.01)
*G01P 5/08*    (2006.01)

(52) U.S. Cl.
CPC . *G01P 3/50* (2013.01); *G01P 5/08* (2013.01)

(58) Field of Classification Search
CPC ...... G01P 3/44; G01P 3/46; G01P 3/48; G01P 3/60; G01P 3/64; G01P 3/56; G01P 3/50; G01P 3/505; G01P 5/08; G01R 19/00; G01R 23/00; H03K 5/26
USPC .................. 324/163, 164; 73/170.08, 170.09
See application file for complete search history.

(56) References Cited

U.S. PATENT DOCUMENTS

| | | | | |
|---|---|---|---|---|
| 3,503,258 A | * | 3/1970 | Baker ................. | G01F 1/58 73/181 |
| 3,595,076 A | * | 7/1971 | Eyges ................. | G01P 5/08 73/861.11 |
| 4,079,626 A | * | 3/1978 | Gardner .............. | G01F 1/58 73/181 |
| 4,688,432 A | * | 8/1987 | Marsh ................. | G01F 1/58 73/861.15 |
| 4,848,146 A | * | 7/1989 | Bruno ................. | G01P 5/08 73/181 |
| 5,402,685 A | | 4/1995 | Brobeil | |
| 5,693,892 A | | 12/1997 | Batey | |
| 6,463,807 B1 | | 10/2002 | Feller | |

(Continued)

FOREIGN PATENT DOCUMENTS

GB    1289120 A    9/1972

*Primary Examiner* — Patrick Assouad
*Assistant Examiner* — Khristopher Yodichkas
(74) *Attorney, Agent, or Firm* — Laubscher, Spendlove & Laubscher, P.C.

(57) ABSTRACT

An electromagnetic boat speedometer includes a boundary layer velocity compensating arrangement comprising a primary coil for producing a primary electromagnetic field within a relatively large first volume of water, a secondary coil for producing a secondary electromagnetic field within a relatively small portion of the first volume of water immediately adjacent the hull of the boat, and a set of first electrodes removably mounted in one or more openings in the hull of the boat, such that the tips of the first electrodes extending into the relatively small water portion. In one embodiment, the coils are simultaneously energized in opposition, so that the primary and secondary electromagnetic fields are in opposition. In a second embodiment, the coils are energized alternately, and the signals produced by the electrodes are modified to achieve the desired boundary layer compensation. A second set of second electrodes may be included in the second embodiment.

22 Claims, 15 Drawing Sheets

(56) References Cited

U.S. PATENT DOCUMENTS

| | | |
|---|---|---|
| 6,996,478 B2 | 2/2006 | Sunshine |
| 7,845,239 B1 | 12/2010 | Lam |
| 8,434,371 B2 | 5/2013 | Marsh |
| 2012/0090403 A1* | 4/2012 | Marsh ................... G01F 1/002 73/861.12 |
| 2014/0047927 A1 | 2/2014 | Marsh |

* cited by examiner

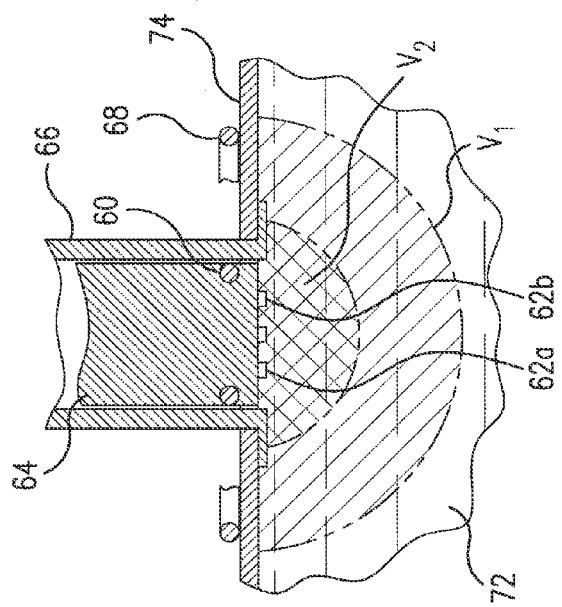
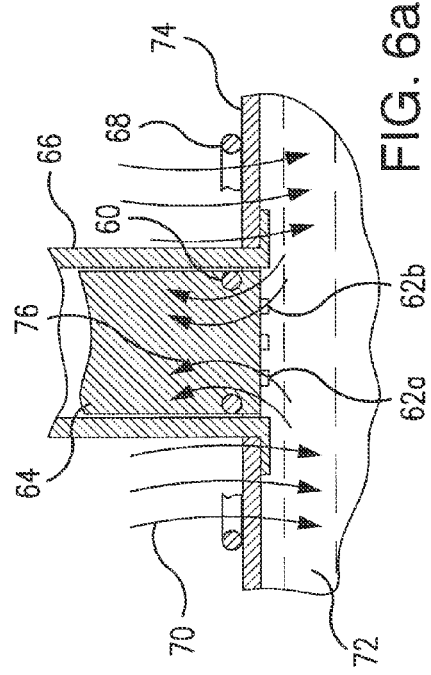
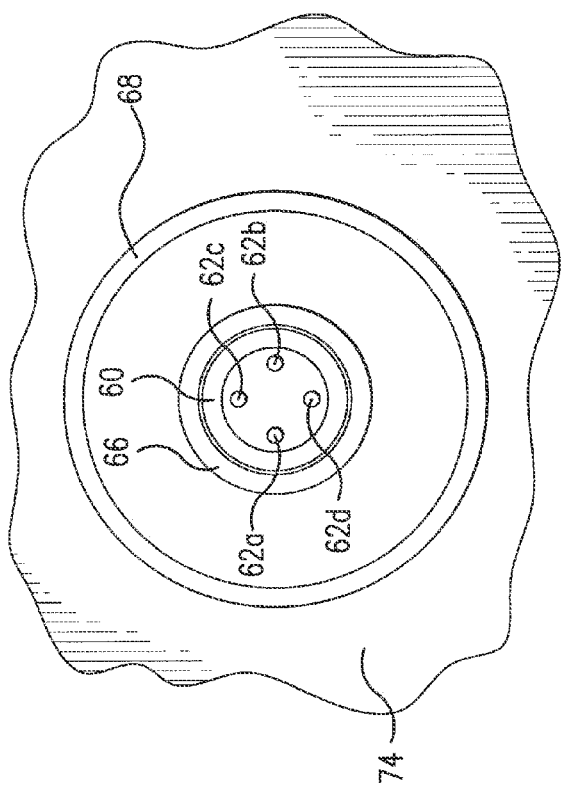
FIG. 6a
FIG. 6b
FIG. 6c

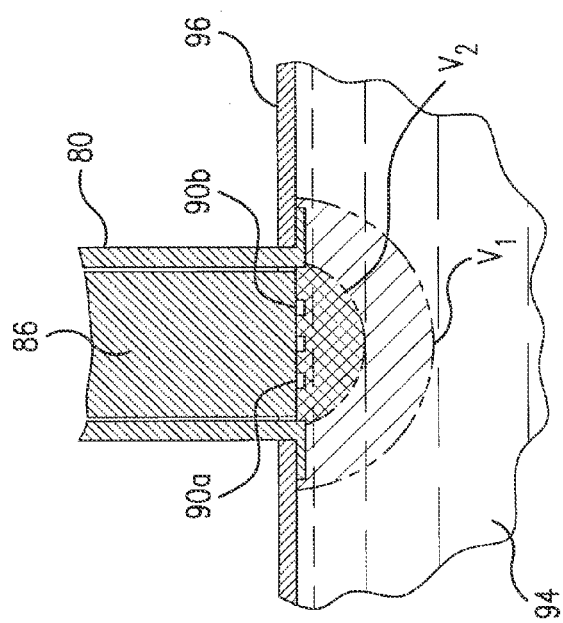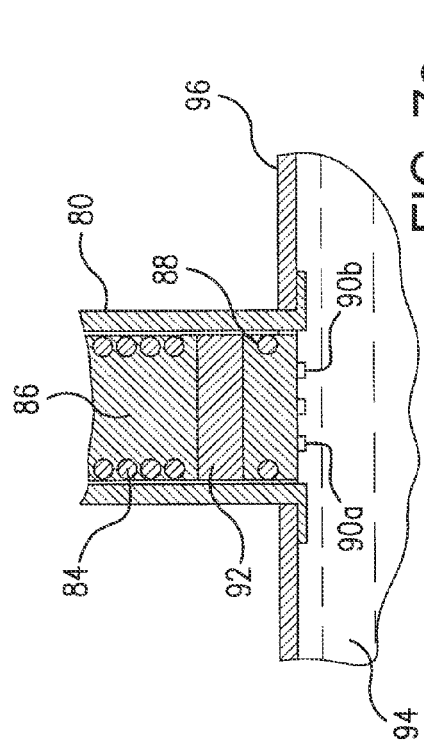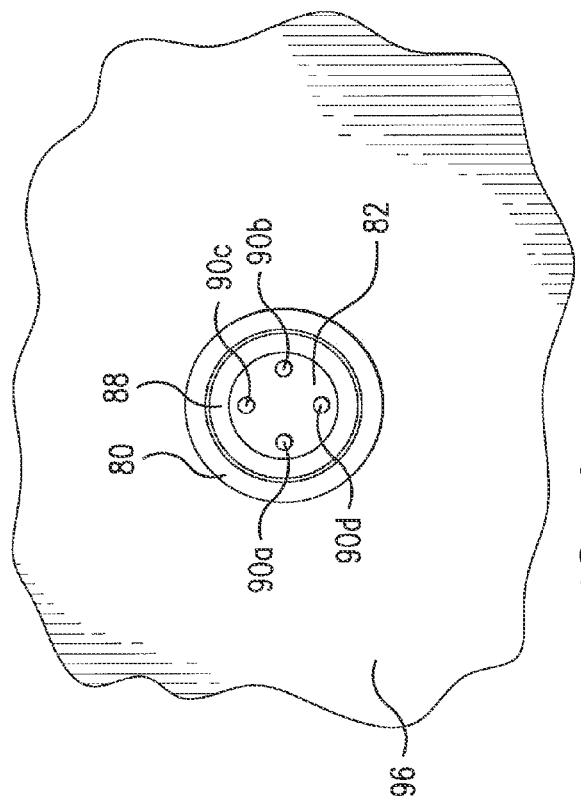

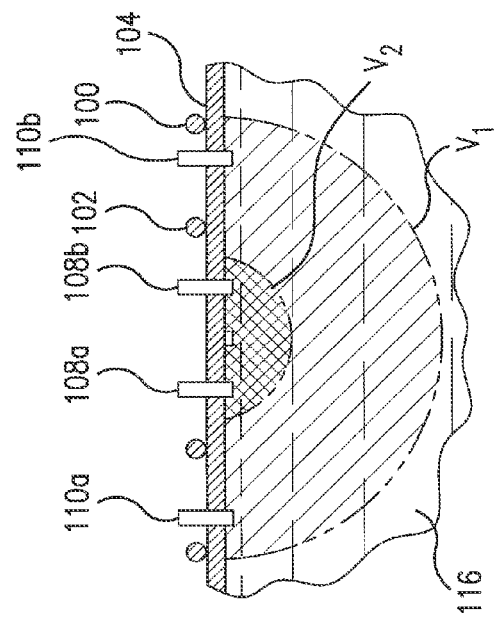
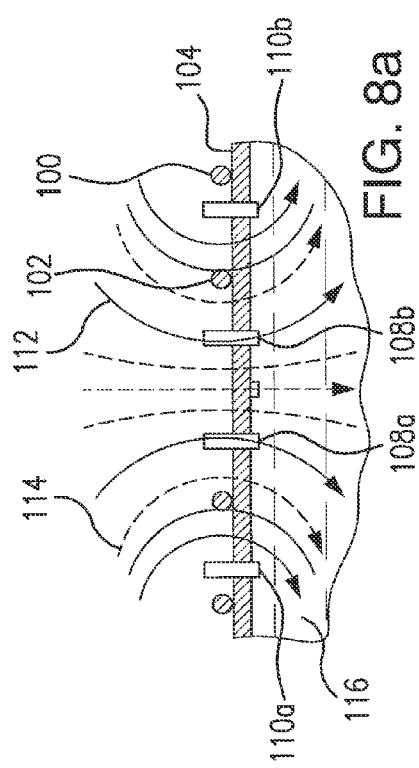
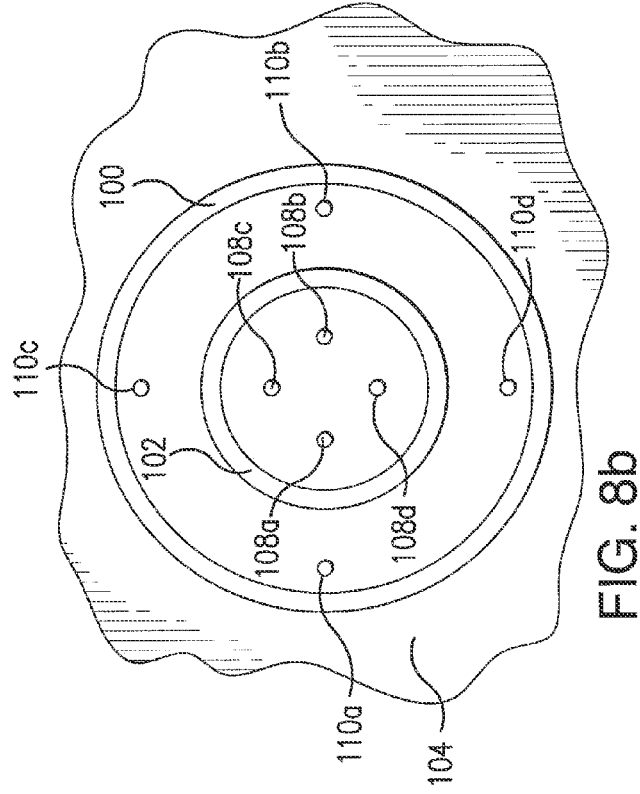
FIG. 8c
FIG. 8a
FIG. 8b

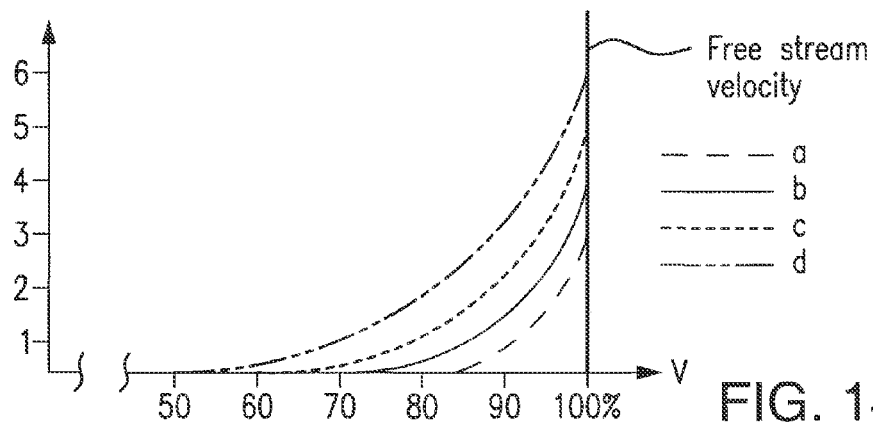
FIG. 14a
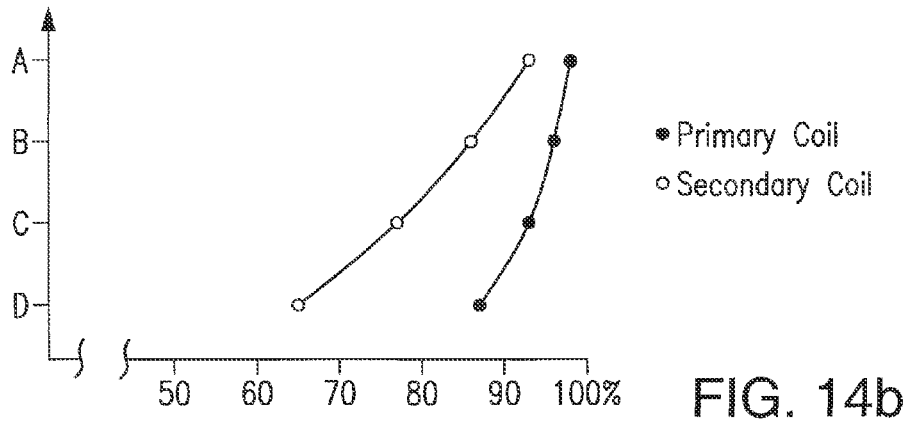
FIG. 14b
| Actual | Primary Signal | Secondary Signal | Ratio S/P | Multiplier |
|---|---|---|---|---|
| 100 | 100 | 100 | 1.00 | 1.00 |
| 100 | 99 | 98 | 0.99 | 1.01 |
| 100 | 98 | 93 | 0.95 | 1.02 |
| 100 | 97 | 88 | 0.91 | 1.03 |
| 100 | 96 | 86 | 0.89 | 1.04 |
| 100 | 95 | 83 | 0.87 | 1.05 |
| 100 | 94 | 80 | 0.85 | 1.06 |
| 100 | 93 | 77 | 0.83 | 1.07 |
| 100 | 92 | 74 | 0.80 | 1.08 |
| 100 | 91 | 65 | 0.77 | 1.09 |
| ⋮ | ⋮ | ⋮ | ⋮ | ⋮ |
FIG. 14c

| SPEED ACTUAL | SPEED MEASURED | RATIO | MULTIPLIER |
|---|---|---|---|
| 5 | 5 | 1 | 1.00 |
| 10 | 9.6 | 0.96 | 1.04 |
| 15 | 13.8 | 0.92 | 1.09 |
| 20 | 18.0 | 0.90 | 1.11 |
| 25 | 22.0 | 0.88 | 1.14 |

ELECTROMAGNETIC BOAT SPEEDOMETER HAVING BOUNDARY LAYER VELOCITY COMPENSATION

REFERENCE TO RELATED APPLICATIONS

This application is related to the Marsh application Ser. No. 13/935,933 filed Jul. 5, 2013, which in turn is a continuation-in-part of the Marsh application Ser. No. 13/587,876 filed Aug. 16, 2012 entitled "Electromagnetic Boat Speedometer", now abandoned.

BACKGROUND OF THE INVENTION

Field of the Invention

An electromagnetic boat speedometer includes a boundary layer velocity compensating arrangement comprising a primary coil for producing a primary electromagnetic field within a relatively large first volume of water, a secondary coil for producing a secondary electromagnetic field within a relatively small portion of the first volume of water immediately adjacent the hull of the boat, and a set of first electrodes removably mounted in one or more openings in the hull of the boat, such that the tips of the first electrodes extending into the relatively small water portion. The coils are energized simultaneously in opposition, or alternately.

Description of Related Art

Electromagnetic flowmeters for measuring the flow of fluid in pipes are well known in the patented prior art, as shown by the inventor's Marsh U.S. Pat. No. 6,598,487, and the patent to Gardner U.S. Pat. No. 4,079,626.

In the boating industry, most pleasure craft utilize some sort of speed indicating device to determine the boat's speed relative to the water. Typical of such devices are paddle wheels, impellors, pitot tubes, ultrasonic sensors and electromagnetic sensors.

Paddle wheels and pitot tubes are prone to repeated fouling by marine growth as well as by debris in the water. Ultrasonic sensors and EM sensors are generally less prone to foul. Consequently, speed sensors are generally designed so that they can be removed from the boat for cleaning, even when the boat is in the water.

In order to facilitate the removal process, manufacturers typically supply the boat owner with a "sea valve" or a special thru-hull penetrator that allows the boat owner to insert various sensors that must make contact with the water to properly function. Typically these sensors include "O-rings" that prevent water from leaking into the boat through this hull penetration.

A problem associated with most existing boat speedometers is that the speed measurement is made very close to the hull of the boat and in such a small volume of water that the speed measurement can be adversely effected by the boat's hull, especially at high speeds and on larger boats.

SUMMARY OF THE INVENTION

Accordingly, a primary object of the present invention is to provide an electromagnetic boat speedometer including compensating means that compensate for boundary layer flow irregularities produced adjacent the outer surface of the hull of the boat.

According to a more specific object, the boundary layer compensating means includes a primary coil for producing a primary electromagnetic field within a relatively large first volume of water adjacent the bottom surface of the hull, a secondary coil for producing a secondary electromagnetic field within a relatively small portion of the first volume of water immediately adjacent the hull of the boat, and a first set of first electrodes removably mounted in one or more openings in the hull of the boat, such that the tips of the first electrodes extend into the relatively small water portion. In one embodiment, the coils are simultaneously energized in opposition, so that the primary and secondary electromagnetic fields are in opposition. In a second embodiment, the coils are energized alternately, and the signals produced by the electrodes are modified to achieve the desired boundary layer compensation. In this second embodiment, a second set of second electrodes may be provide having tips that extend into the first volume of water associated with the primary coil.

A further object is to provide such an electromagnetic speedometer wherein the primary coil is annular and is arranged concentrically about a smaller annular secondary coil, with the set of electrodes being arranged within the secondary coil. In another modification, the secondary coil and the electrodes are removably mounted in a penetrator member that is mounted in a hull opening. In a further modification, the primary coil may be a helical coil that is also mounted concentrically within the penetrator member.

According to a more specific object of the invention, a Hall effect device is provided adjacent the secondary coil to further compensate for inaccuracies of velocity measurement immediately adjacent the surface of the hull.

The first electrodes measure flow immediately adjacent the hull, which arrangement is more susceptible to boundary layer errors caused by the changing flow regime near the hull. The flow signals are combined in a signal processor such that the secondary field signals are used to correct the primary field signals, thereby causing the resultant flow signal to more accurately correspond with the true velocity of the boat.

According to another object, a measuring system is provided that measures substantially larger volumes of water, thereby significantly reducing the effects of the hull on the speed measurement. Additionally, the sensor can be configured either to sense only one axis of flow or, to measure both the fore-aft speed and the cross flow from port to starboard.

According to a more specific object of the invention, an electromagnetic speedometer is provided including an annular primary coil, a smaller secondary annular coil arranged concentrically within the primary coil, a set of first electrodes arranged within the secondary coil, a second set of second electrodes arranged between the primary and secondary coils, and switch means producing alternate energization of the primary and secondary electromagnetic coils, thereby to prevent any interaction of the magnetic fields. The flow signals are combined in a signal processor such that the secondary flow signal is used to correct the primary flow signal, whereby the measured primary flow signal more accurately agrees with the true velocity of the boat.

The electromagnetic velocity sensor is suitable for use on pleasure boats and other small water craft where the sensor or the sensing electrodes can be easily removed for cleaning without a large inrush of water. Additionally, improved methods are provided for measuring the flow beyond the immediate boundary layer of a moving boat. In general, this is accomplished by using a self-sealing electrode assembly that substantially seals against water intrusion. Additionally, an improved method is provided for measuring the flow beyond the boundary layer immediately adjacent the hull of a moving boat.

According to a further object of the invention, the measurements of both forward speed and the leeway relative to the water are combined with GPS signals which measure the boat speed relative to land, thereby to obtain direct measurement of the local currents that exist in the water.

The velocity errors caused by the boundary layer are often of such a magnitude that racing enthusiasts require even higher accuracy. It was indicated that the greater the volume that is energized by the magnetic field, the greater is the volume of water that effects the detected velocity signal. It was shown that the larger the diameter of an annular coil the greater is the energized volume and the less effects that flow near the hull has on the total detected signal.

According to the present invention, the effects of the near-hull flow that make up a part of the detected signal can be substantially removed from the composite signal, whereby the hull-induced speed errors are significantly removed from the primary speed measurement. This is accomplished by using two coils, wherein a primary coil energizes a much greater volume of water than does a secondary coil.

BRIEF DESCRIPTION OF THE DRAWINGS

Other objects and advantages of the invention will become apparent from a study of the following specification, when viewed in the light of the accompanying drawing, in which:

FIG. 3 are waveforms indicating the opposite phase energization of the primary and secondary coils of FIG. 2a;

FIG. 4 is a block diagram of the electrical circuit for the electromagnetic boat speedometer using the primary and secondary coils of FIG. 2a;

FIGS. 6a and 6b are vertical section and bottom plan views, respectively, of a second modification of the apparatus for FIG. 2a using a through-hull penetrator member, and FIG. 6c illustrates the volumes of water energized by the primary and secondary coils of FIG. 6a, respectively;

FIGS. 7a and 7b are vertical section and bottom plan views, respectively, of a third modification of the apparatus for FIG. 2a using a through-hull penetrator, and FIG. 7c illustrates the volumes of water energized by the primary and secondary coils of FIG. 7a, respectively;

FIGS. 8a and 8b are vertical section and top plan views, respectively, of a second embodiment of the invention, wherein the primary and secondary coils are energized alternately, and FIG. 8c illustrates the volumes of water energized by the primary and secondary coils of FIG. 8a, respectively;

FIG. 9a illustrates the waveforms of the energizing signals applied to the primary and secondary coils of FIG. 8a, and FIG. 9b is a block diagram of the electrical circuit for operating a boat speedometer using the primary and secondary coil arrangement of FIG. 8a;

FIG. 14 is a family of curves illustrating the laboratory-generated velocity gradients that are representative of those gradients that might exist under at-sea conditions; FIG. 14b is a set of resulting curves illustrating the flow signals of the primary and secondary coils; and FIG. 14c is a look-up table that is used to modify the primary signal as a function of the ratio of the secondary signal to the primary signal.

DETAILED DESCRIPTION OF THE INVENTION

Figure 1A:
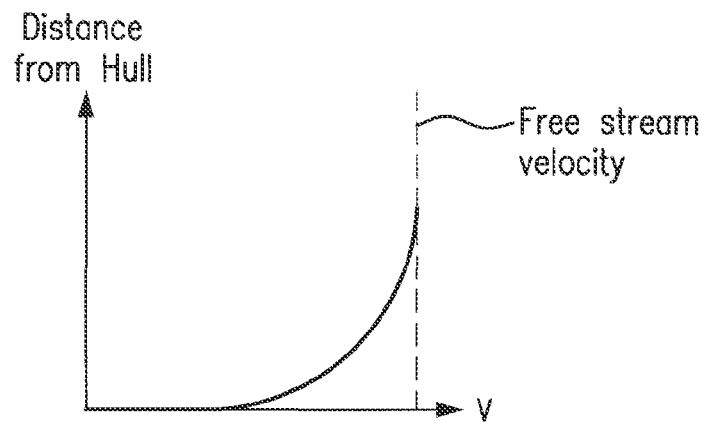
FIG. 1a is a graph of a curve indicating the relationship of boat velocity measurement relative to the distance of the measurement from the hull.
Figure 1B:
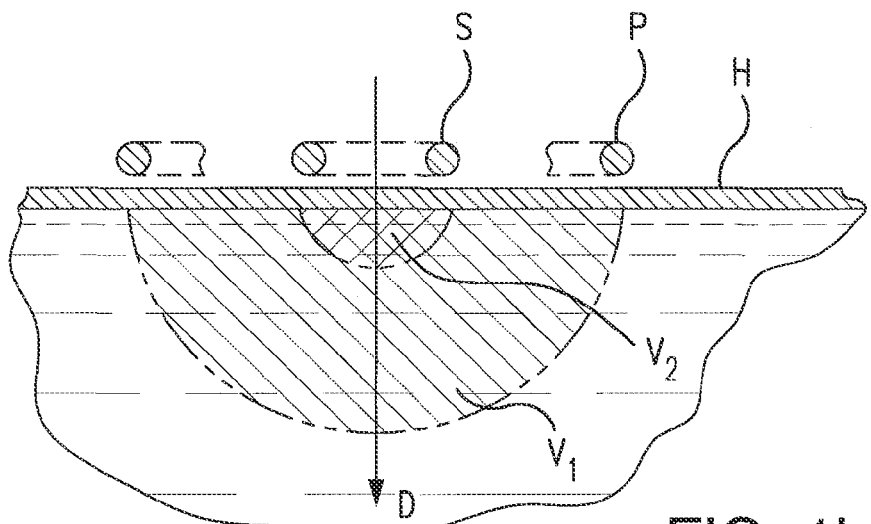
FIG. 1b is a schematic representation of the volume of water affecting measurements relative to the distance of the measurement from the hull.
Figure 1C:
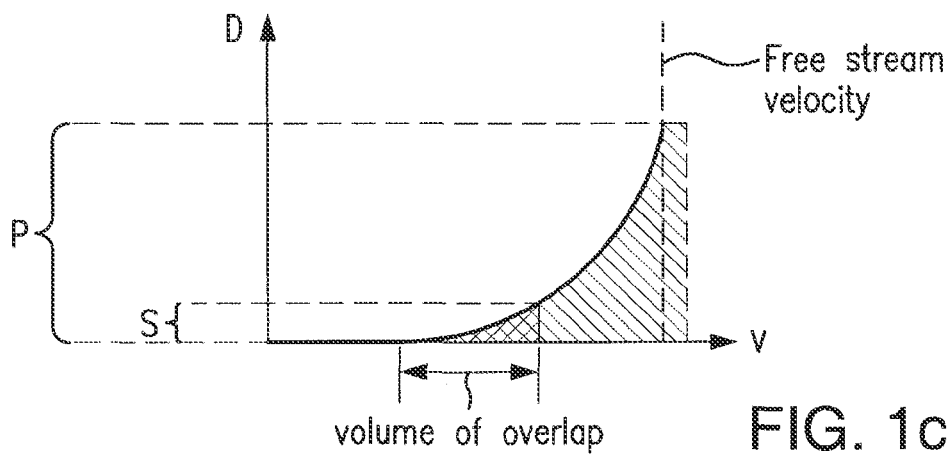
FIG. 1c illustrates the relationship of measured velocity relative to the distance of the measurement from the hull of the boat.

In accordance with the present invention, velocity measurement correction means are provided for correcting for hull-induced inaccuracies. As shown in FIG. 1a, the velocity V near the hull of a boat varies with distance D from the hull. Note that the velocity at the hull is essentially zero and that as the distance from the hull increases, the velocity slowly increases until eventually it becomes equal to the free stream velocity, where the hull no longer affects the flow. FIG. 1b illustrates the areas of water volume influence $V_1$ of a large primary coil/electrode assembly P relative to a smaller volume portion $V_2$ produced within the larger water portion by a secondary coil/electrode assembly S. As shown in FIG. 1c, these areas of influence are compared with the velocity gradient of the flow in the vicinity of the hull. It is noted that the large coil/electrode assembly includes the flow measured by the small coil/electrode assembly plus an additional volume of flow well beyond the measure range of the small coil/electrode assembly. It has been determined in the past that the boundary layer flow near the hull is affected more with increasing velocity than does flow at a greater distance from the hull. Thus, the velocity measurement from the small coil/electrode assembly S has a less stable relationship relative to the free stream velocity than does the larger coil/electrode assembly P. Consequently, the larger the coil and the greater the electrode separation, the greater is the depth of the velocity measurement, and less are the effects of changes in the near hull flow.

The primary coil P and the secondary coil S can either be driven simultaneously in opposition to create a null field near the hull, or they can be driven alternately so that two separate flow signals can be obtained—namely, a primary signal that is influenced by flow both near the hull and up to a distance of 6 inches or greater (depending on the diameters of the coils), and a secondary signal that is influenced mainly by flows less than an inch from the hull (again depending on the diameters of the coils). If one chooses the first method of creating a near zero magnetic field (a null) near the hull, then further modification of the primary signal by the secondary signal is not needed, because the resultant signal is substantially free of the nearby hull effects. In such an embodiment only one set (i.e., 2 pairs) of electrodes are used, and that set is placed inside the two concentric coils with a separation distance between electrodes of approximately 80% of the diameter of the secondary coil. In the second embodiment where the two coils are driven alternately, two separate signals are obtained. This permits further modification, since the two signals are separate and the secondary signal can be used to modify the primary signal either by a simple subtractive process, or by the use of a lookup table.

(1) Coils Simultaneously Driven in Opposition

Figure 2C:
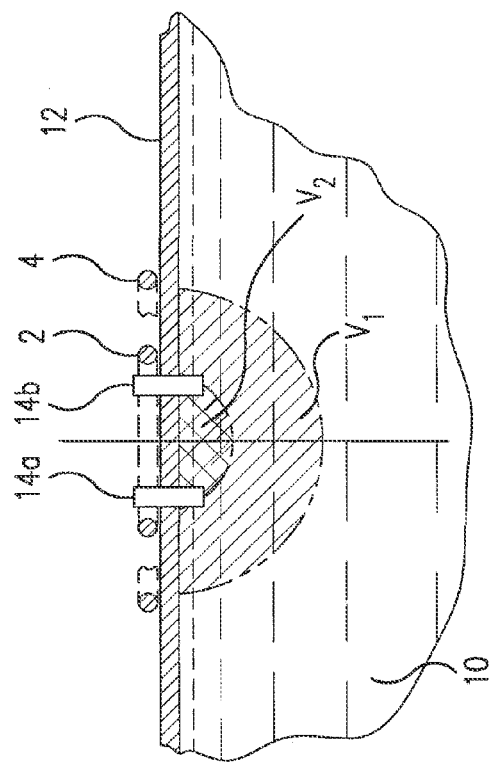
FIG. 2c illustrates the volumes of water energized by the primary and secondary coils of FIG. 2a, respectively.
Figure 2A:
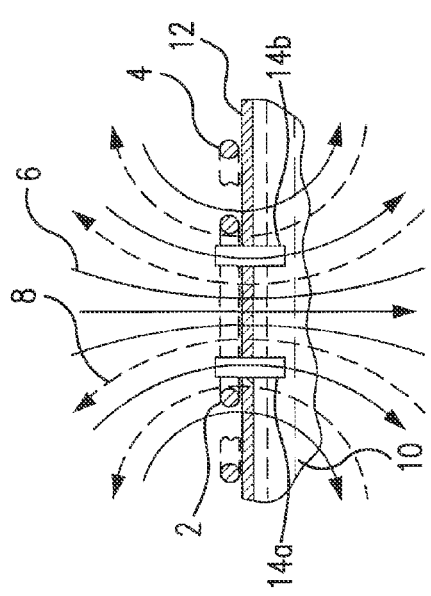
FIGS. 2a and 2b are vertical section and top plan views, respectively, of a first embodiment of the invention, wherein the primary and secondary coils are energized simultaneously in opposition.
Figure 2B:
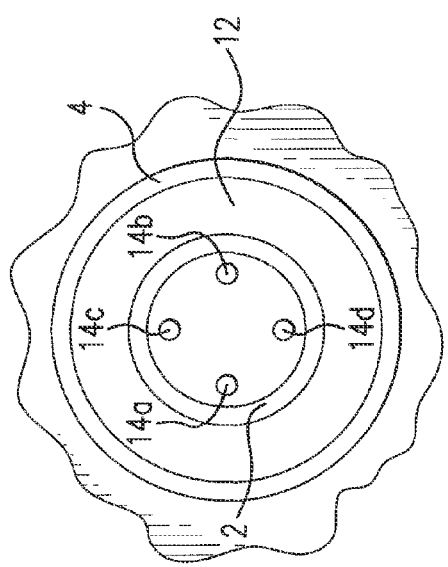
Figure 3A:
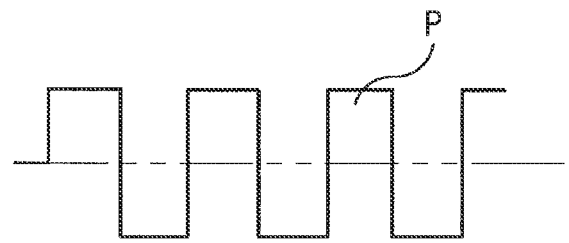
Figure 3B:
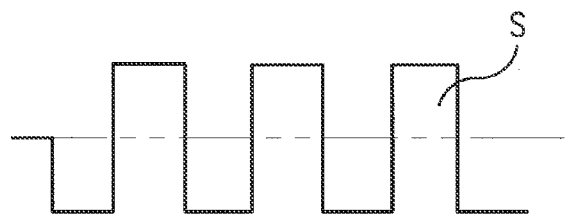

Referring now to FIGS. 2a and 2b, an annular secondary coil 2 having a diameter of about 3 inches is mounted on the hull 12 of a boat concentrically within an annular primary coil 4 having a diameter of about 8 inches. In this embodiment, the primary and secondary coils are simultaneously energized in phase opposition, as shown by the waveforms P and S in FIG. 3. These coils produce the opposing magnetic fields 6 and 8 shown in FIG. 2a, thereby respectively affecting in the water 10 beneath the lower surface of the hull 12 the relatively large primary coil volume $V_1$, and the smaller volume $V_2$ (which is a portion of the larger volume). A first set of two pairs of first electrodes are removably mounted in corresponding self-sealing openings contained in the hull 12, whereby the electrodes may be removed for cleaning. A first pair of the first electrodes 14a, 14b are arranged in transversely spaced relation relative to the longitudinal axis of the boat, and a second electrode pair 14c and 14d are arranged in longitudinally spaced relation. The electrodes of each pair are spaced a distance of about 80% of the diameter of the secondary coil.

Figure 4:
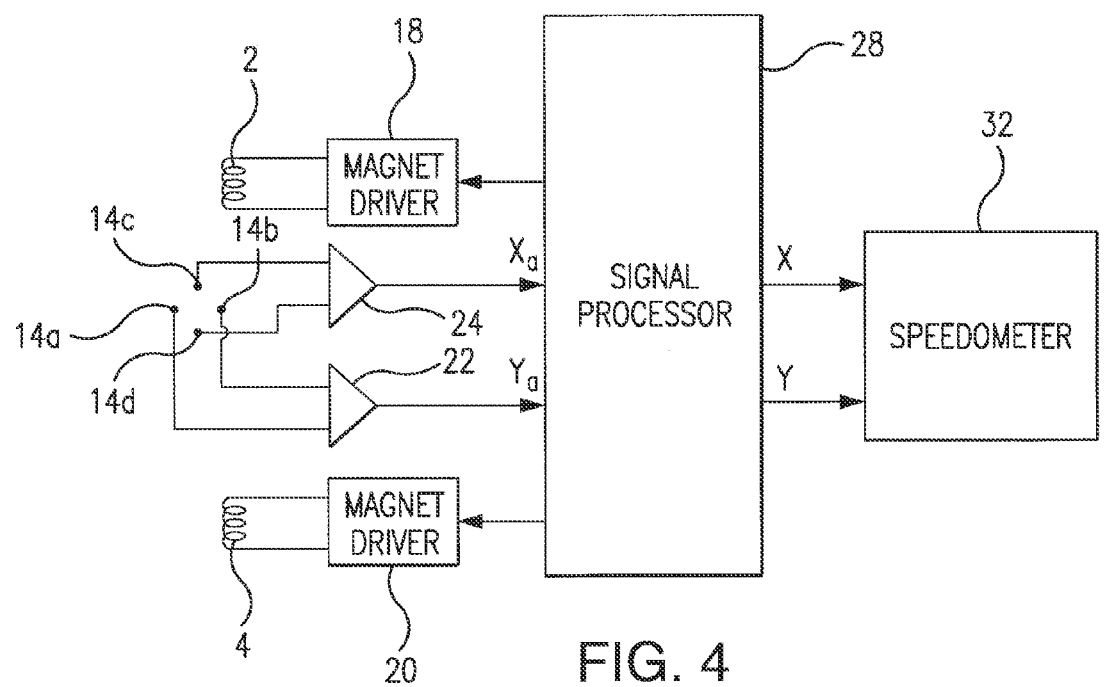

As shown in FIG. 4, the coils 2 and 4 are driven in phase opposition by the magnet drivers 18 and 20, and the signals Xa and Ya from the electrode pairs 14a,14b and 14c,14d are amplified by the devices 22 and 24 and are supplied to the signal processor 28. The output signals X and Y from the signal processor are supplied to the speedometer 32.

Figure 5C:
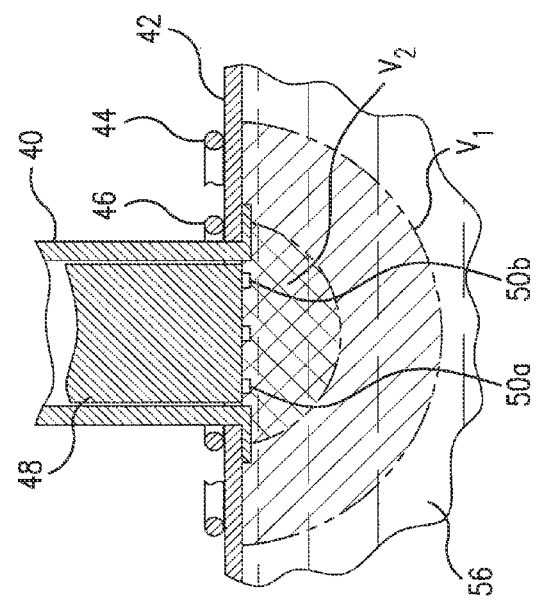
FIG. 5c illustrates the volumes of water energized by the primary and secondary coils of FIG. 5a, respectively.
Figure 5A:
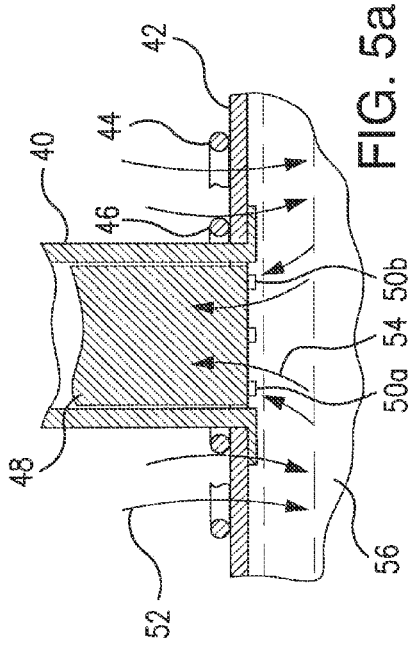
FIGS. 5a and 5b are vertical section and top plan views, respectively, of a first modification of the coil arrangement of FIG. 2a, including a through-hull penetrator.
Figure 5B:
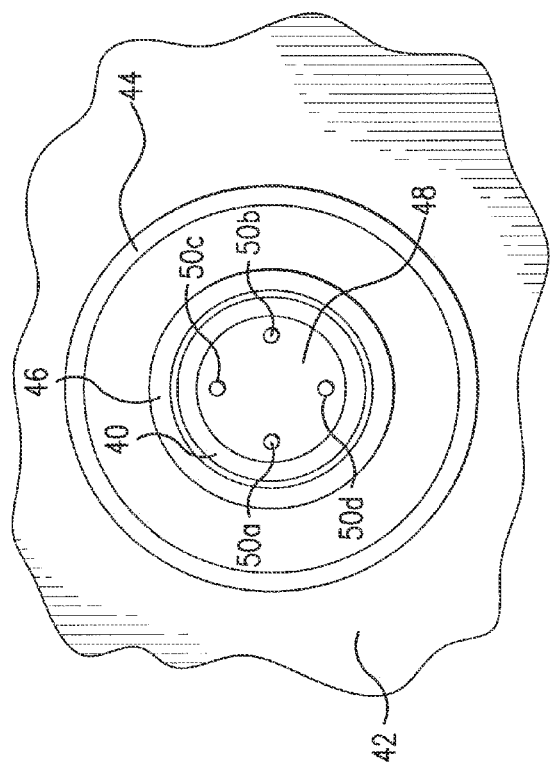

In a first modification shown in FIGS. 5a-5c, there is provided a standard tubular through-hull penetrator member 40 that is mounted in an opening contained in the hull 42, and the primary coil 44 and the secondary coil 46 are mounted coaxially on the upper surface of the hull in concentrically spaced relation about the penetrator member. Removably mounted in the penetrator member is an electrode support member 48 that carries the electrode pairs 50a, 50b and 50c, 50d. The primary and secondary coils simultaneously produce opposing electromagnetic fields 52, 54 that affect relatively large and relatively small first and second water volumes $V_1$ and $V_2$, respectively. The signals from the electrode pairs are processed and transmitted to the boat speedometer as shown in FIG. 4. A particular configuration would have a primary coil of approximately 7 inches in diameter with 700 turns of #32 wire. The secondary coil would have a diameter of approximately 2½ inches and would have 700 turns of #34 wire.

In a second modification shown in FIGS. 6a-6c, the secondary coil 60 and the electrode pairs 62a, 62b and 62c, 62d are carried by the removable support member for removal as a unit from the penetrator member 66. The primary coil 68 establishes an electromagnetic field 70 that extends in one direction into the water 72 beneath the hull 74, thereby to affect a large volume $V_1$. The secondary coil 60 simultaneously establishes in the opposite direction an electromagnetic field 76 that affects a smaller volume $V_2$, into which the tips of the electrodes extend. A particular configuration would have a primary coil of approximately 7 inches in diameter with 700 turns of #32 wire. The secondary coil would have a diameter of approximately 1 inch and would have 300 turns of #34 wire.

In the third modification shown in FIGS. 7a-7c, there is removably mounted in the through-hull penetrator member 80 a support member 82 that carries as a unit a helical primary winding 84 arranged on a cylindrical ferromagnetic core 86, an annular secondary coil 88, a set of two pairs of electrodes 90a, 90b and 90c, 90d, and a non-ferromagnetic, synthetic plastic spacer member 92 arranged between the primary and secondary coils. The primary coil 84 and the secondary coil 88 are simultaneously energized to establish opposing magnetic fields, thereby to affect, respectively, a relatively large volume of water $V_1$, and a relatively smaller portion $V_2$. The two coils are driven simultaneously in opposite directions, thereby to create a volume of water $V_2$ of destructive interference where the two fields overlap in the vicinity of the electrode tips.

In the embodiment of FIG. 7a-7c, because of the size constraint of the standard hull penetrator 80, a large diameter annular coil could not be used. Therefore, a long solenoidal primary coil with permeable core is used. This permits the magnetic field to penetrate more deeply into the water. The secondary coil 88 is a short annular coil, and preferably does not have a ferromagnetic core. To reduce the effects of the core 86 on the magnetic field of the secondary coil, the synthetic plastic non-ferromagnetic spacer 92 is provided between the two coils, which are driven simultaneously in opposite phase. A particular configuration would have a primary coil of approximately 1 inch in diameter and 3 inches long (with a ferromagnetic core) with 3000 turns of #31 wire. The secondary coil would have a diameter of approximately 1 inch and a length of 0.5 inches would have 1000 turns of #34 wire.

(2) Coils Alternately Energized

Figure 9A:
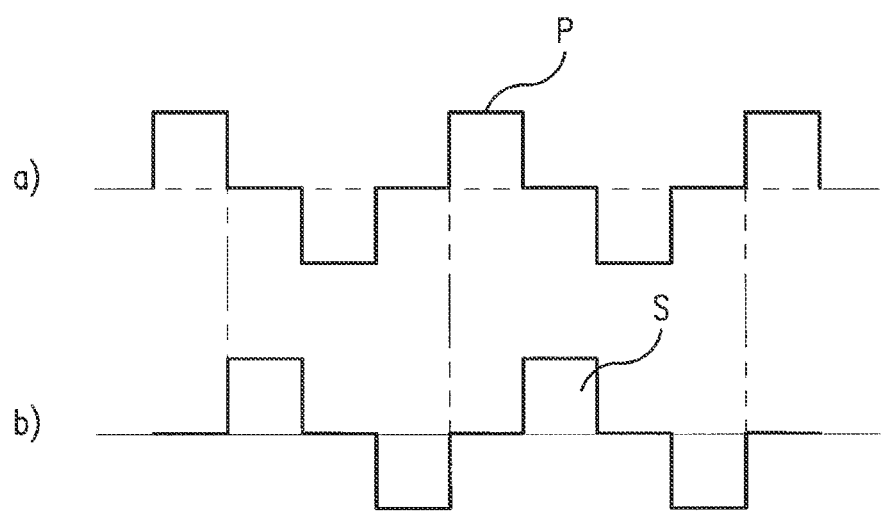

Referring now to a second embodiment of the invention shown in FIGS. 8a-8c, the annular primary coil 100 and the annular coaxially-arranged concentrically-spaced secondary coil 102 are alternately driven, thereby to produce the waveforms shown in FIG. 9a. This method produces two separate and distinct speed measurements—namely, a primary signal (which contains many speeds from the hull 104 out to about 8 inches from the hull), and a secondary signal (that contains only signals out to approximately 1 to 2 inches from the hull). The annular secondary coil 102 has a diameter of about 3 inches, and the annular primary coil 100 has a diameter of about 8 inches. A first set of two pairs of first electrodes 108a,108b and 108c,108d is arranged within the secondary coil with a spacing distance of about 2 inches. A second set of two pairs of second electrodes 110a,110b and 110c,110d is arranged between the primary and secondary coils. These electrodes are all removably mounted in a self-sealing manner in corresponding openings contained in the hull 104, and have a spacing distance of about 7 inches.

The coils are alternately energized such that the primary coil 100 generates in the water an electromagnetic field 112 shown by the solid lines in FIG. 8a, thereby affecting in the water 116 the relatively large volume $V_1$. The secondary coil 102 produces the field shown by the dashed lines 114, thereby affecting the smaller water portion $V_2$. The tips of the first electrodes 108a-108d extend into the smaller volume portion $V_2$, and the tips of the second electrodes 110a-110d extend into the larger first volume portion $V_1$.

Figure 9B:
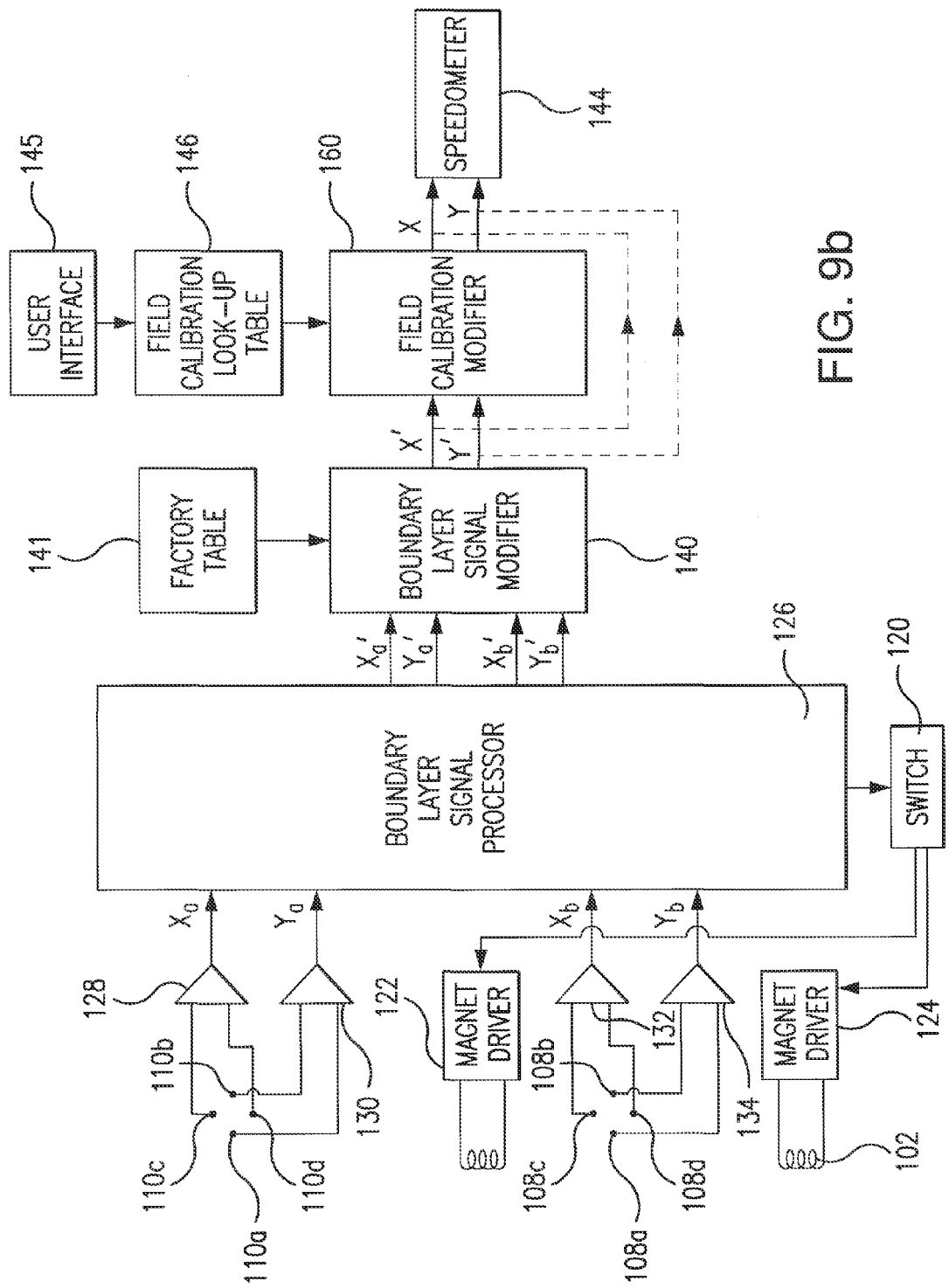

Referring to the electrical system shown in FIG. 9b, it will be seen that the switch 120 effects alternate energization of the primary and secondary coils 100 and 102 via the magnetic drivers 122 and 124, respectively. The signals Xa,Ya from the primary volume electrodes 110a-110d are supplied to the signal processor 26 via the amplifiers 128 and 130, and the signals Xb,Yb from the secondary electrodes 108a-108c are supplied to the signal processor 126 via the amplifiers 132 and 134. The output signals Xa',Ya' and Xb',Yb' from the boundary layer signal processor 126 are modified by the signal modifier 140, whereby the secondary flow signals modify and correct the primary flow signals. As shown by the dotted lines, the resultant signal X',Y' could be supplied directly to the speedometer 144. Thus, this factory installed signal modifier would produce a simple subtraction of the secondary signal from the primary signal.

However, the modifier could be more complex, either through magnetic field modeling or extensive tests. The manufacturer of the speedometer would determine the relationship between the free stream velocity, the velocity measured by the primary coil/electrodes and the velocity measured by the secondary coil/electrodes for each set of various primary coils and secondary coils that is sold as a product. To this end, a factory table input signal 141 would be supplied to the boundary layer signal modifier 140.

Referring to FIG. 14a, a family of curves representing various velocity profiles can be generated by the manufacturer in a flow facility, or through mathematical modeling using hydraulic relationships. If generated in a flow facility, a "flow sled" can be utilized in a towing facility where various blockages will create expected velocity profiles similar to those measured by boat designers for various shapes and sizes of hulls. Note that in FIG. 14a, curve (d) is more extreme than curve (a). The manufacturer will install a set of primary and secondary coils and accompanying electrodes on the water sled and tow this speedometer under the various blockages, thereby to determine the response of the primary signal and the secondary signal to each condition. This is shown in FIG. 14b. Note that the primary signal P is less sensitive to the change in profiles than is the secondary signal S. A best fit line is applied to these data points and a table (FIG. 14c), is generated. In this table of FIG. 14c, the ratio of the secondary signal to the primary signal is calculated, and a multiplier generated that is used to modify the primary signal, Xa', Ya', creating resultant signals X' and Y'. These two signals representing the factory corrected velocity signals can be supplied directly to the speedometer readout 144, or can be further modified by a customer-generated lookup table 146 that is obtained during an "at-sea" calibration by use of the user-interface 145.

Traditionally, meticulous sailors will perform an at-sea calibration of their speedometer. This is accomplished using a standard technique of known distances and time to calculate the actual speed at sea. Since the existing location of the hull penetrator (or perhaps the unique design of a boat hull) can ultimately effect the accuracy of the displayed speed, at-sea calibrations are often performed" to give the sailor confidence that the speedometer is performing at its best and will compensate for unusual boat hull designs or for limited choices of where the speedometer is located.

Figures 15A, 15B:
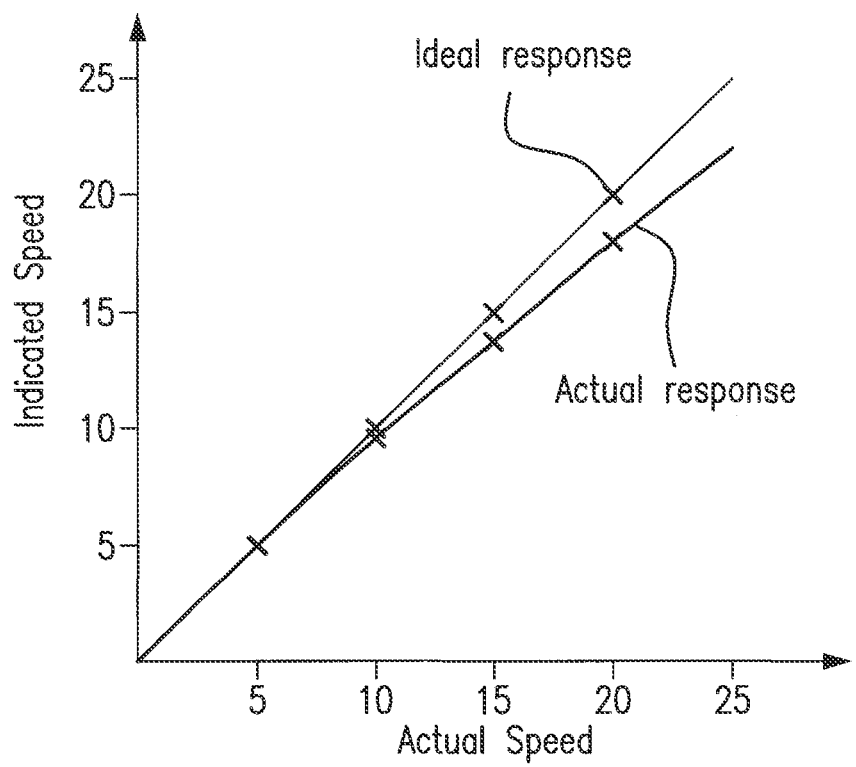
FIG. 15a is a graph comparing the indicated speed versus the actual speed for a particular boat and a particular location of the speedometer under actual at-sea conditions.
FIG. 15b illustrates a user-generated table that is used to provide a unique field calibration to the boat of a user.

FIG. 15a depicts a graph of a typical at-sea calibration. Using known distances or GPS signals, various speed runs are made to compare the speedometer's indicated speed to that obtained by alternate means. The actual data is installed into a second lookup table 146 which is applied to second signal modifier 160. The resultant corrected signals Xc and Yc are then supplied to the speedometer readout device 144.

Figure 10C:
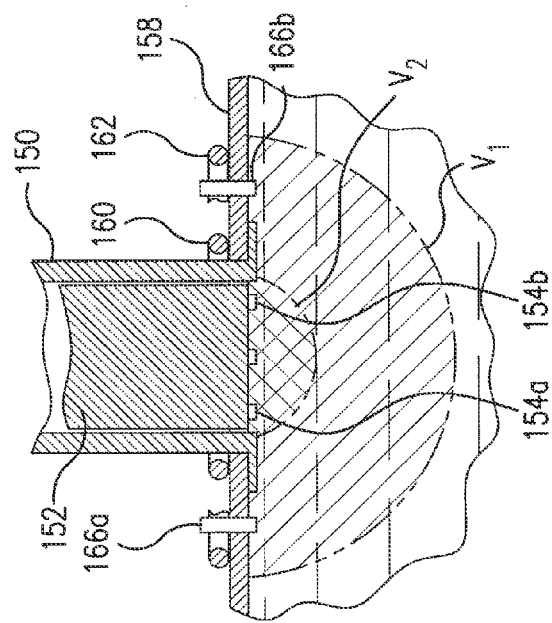
FIG. 10c illustrates the volumes of water energized by the primary and secondary coils of FIG. 10a, respectively.
Figure 10A:
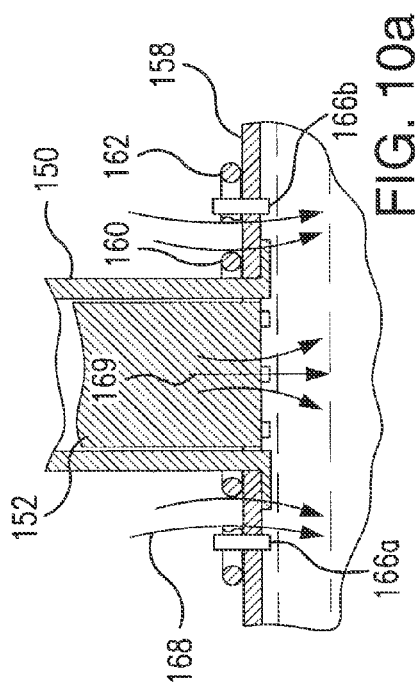
FIGS. 10a and 10b are vertical section and top plan views, respectively, of a first modification of the coil arrangement of FIG. 8a, including a through-hull penetrator.
Figure 10B:
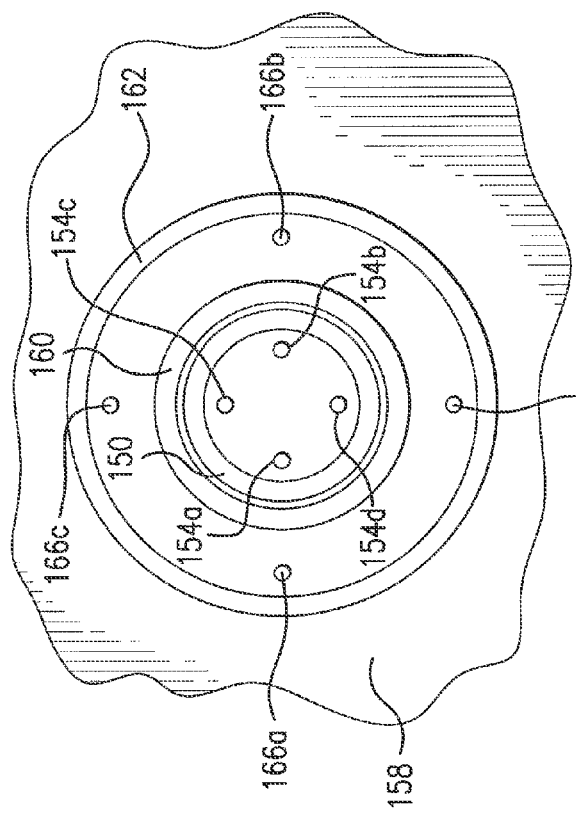

Referring now to FIGS. 10a-10c, according to a first modification of the apparatus of FIG. 8a, a through-hull penetrator member 150 is provided within which is removably supported for cleaning an electrode support member 152 that supports the pairs of first electrode pairs 154a,154b and 154c,154d. Mounted coaxially on the upper surface of the hull 158 concentrically about the penetrator member are the smaller annular secondary coil 160 and the larger annular primary coil 162. Removably mounted for cleaning in hull openings contained between the primary and secondary coils are pairs of second electrodes 166a,166b and 166c,166d. The alternately energized primary and secondary coils produce fields 168 and 169 that affect the water volumes $V_1$ and $V_2$, respectively, shown in FIG. 10c, with the tips of the first electrodes 154a-154d extending into the smaller volume $V_2$, and with the tips of the electrodes 166a-166c extending into the larger volume $V_1$. The signals from the electrodes are processed in the manner shown in FIG. 9b. The volume of water $V_2$ adjacent the hull affecting secondary measurement is less than the volume of water $V_1$ affecting primary measurement, and the associated signal is used to correct the total velocity signal measurement sent to the speedometer. The two coils are driven in alternate fashion, and the signal at the time of the secondary coil being energized is subtracted from the signal at the time that the primary coil is energized. This result in a relatively highly accurate signal that is substantially free from the boundary layer deviations. A particular configuration would have a primary coil of approximately 7 inches in diameter with 700 turns of #32 wire. The secondary coil would have a diameter of approximately 2½ inches and would have 700 turns of #34 wire.

Figure 11C:
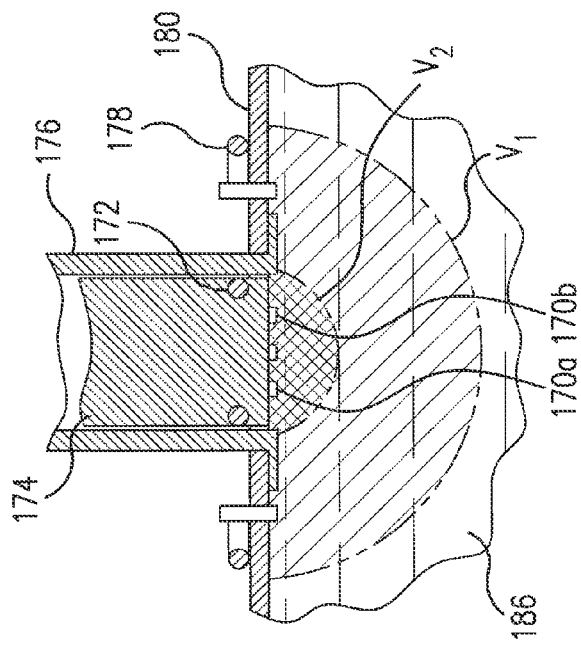
FIG. 11c illustrates the volumes of water energized by the primary and secondary coils of FIG. 8a, respectively.
Figure 11A:
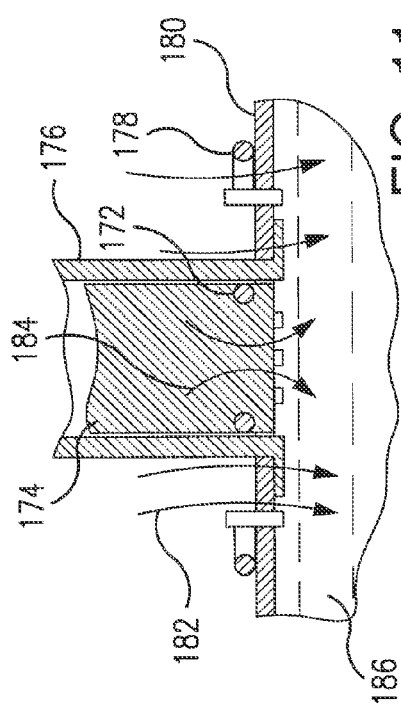
FIGS. 11a and 11b are vertical section and top plan views, respectively, of a second modification of the coil arrangement of FIG. 8a, including a through-hull penetrator.
Figure 11B:
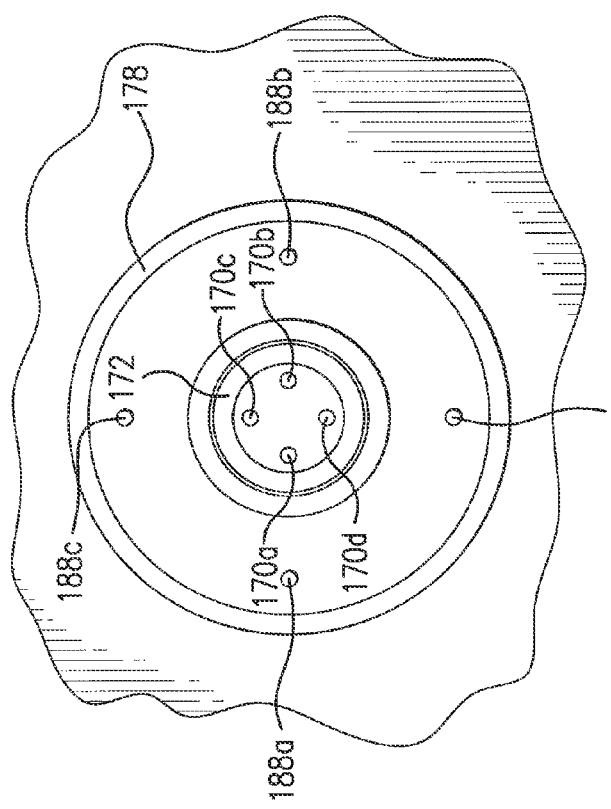

According to a second modification shown in FIGS. 11a-11c, the first electrodes 170a-170d and the secondary coil 172 are mounted on an electrode support member 174 that is removably mounted for cleaning in the through-hull penetrator member 176. The annular primary coil 178 is mounted on the upper surface of the hull 180 in concentrically spaced relation about the penetrator member. The alternately energized primary and secondary coils 178 and 172 produce fields 182 and 184 that affect in the water 186 the relative large volume $V_1$, and the relatively small volume $V_2$, respectively. The second set of pairs of second electrodes 188a,188b and 188c,188d are removably mounted in self-sealing openings contained in the hull, in the space between the penetrator member and the primary coil, and adjacent the primary coil. Consequently, the tips of the electrodes extend into the volumes $V_1$ and $V_2$ associated with the primary field 182 and the secondary field 184, respectively. The signals from the electrodes are processed by the circuit of FIG. 9b. A particular configuration would have a primary coil of approximately 7 inches in diameter with 700 turns of #32 wire. The secondary coil would have a diameter of approximately 1 inch and would have 300 turns of #34 wire.

Figure 12C:
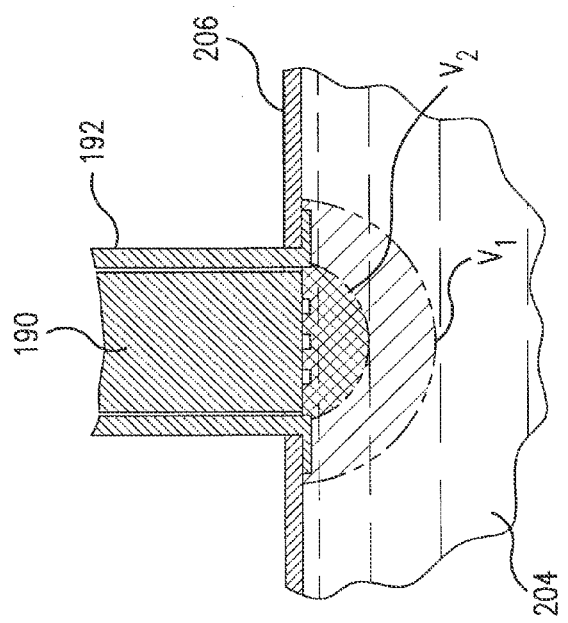
FIG. 12c illustrates the volumes of water energized by the primary and secondary coils of FIG. 8a, respectively.
Figure 12A:
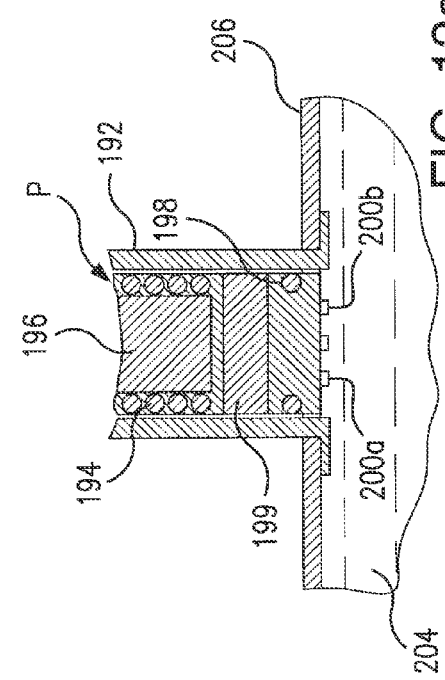
FIGS. 12a and 12b are vertical section and top plan views, respectively, of a third modification of the coil arrangement of FIG. 8a, including a through-hull penetrator and one set of electrodes.
Figure 12B:
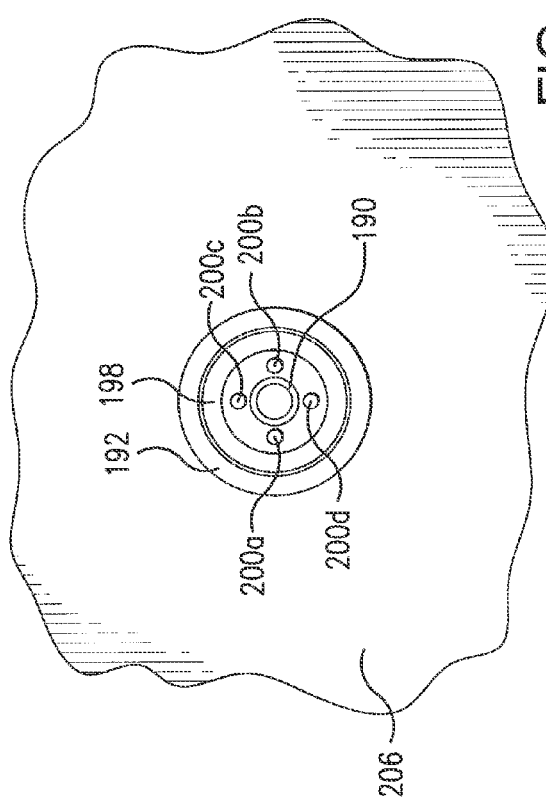

In the third modification shown in FIGS. 12a-12c, the electrode support member 190 removably supports within the hull penetrator member 192 as a unit the primary winding P (which in this case comprises a helical winding 194 with a ferromagnetic core 196), the annular secondary coil 198, a non-ferromagnetic synthetic plastic spacer member 199, and a first set of two pairs of first electrodes 200a-200d. The primary and secondary coils are alternately energized to affect in the water 204 beneath the hull 206 relatively large and the relatively small volumes $V_1$ and $V_2$, respectively. The synthetic plastic non-ferromagnetic spacer 199 prevents interference between the primary field produced by primary winding 194 and the field produced by the secondary coil 198. A particular configuration would have a primary coil of approximately 1 inch in diameter and 3 inches long (with a ferromagnetic core) with 3000 turns of #31 wire. The secondary coil would have a diameter of approximately 1 inch and would have 1000 turns of #34 wire It should be noted that because of size constraints, the primary coil is a helical winding with a ferromagnetic core. This permits the primary field to penetrate more deeply into the water 204, with the synthetic plastic spacer member 199 serving to distant the secondary coil from the ferromagnetic core of the primary coil, thereby eliminating any unwanted interference. As before, in this modification, the two coils are driven in an alternating fashion, but only one set of electrodes is provided, since owing to the mounting of the two coils end-to-end in the same housing, the separation distance of a second set of electrodes would be too similar to the first spacing to provide any advantage. Thus, the operating circuit would correspond to that of FIG. 9b, but with only one set of electrodes. In this case, the alternately generated secondary signals are subtracted from the alternately generated primary signals, a resultant signal is supplied to the boat speedometer that is substantially free from the boundary layer irregularities.

Figure 13A:
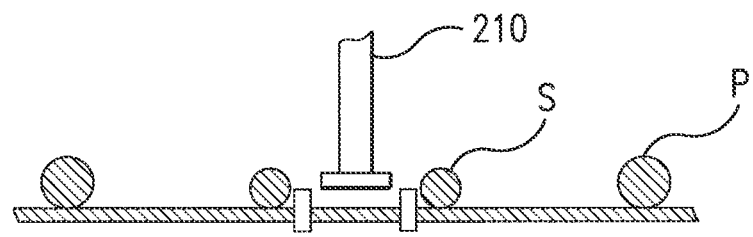
FIG. 13a illustrates the manner in which a Hall effect device is arranged relative to a first primary and secondary coil arrangement.
Figure 13B:
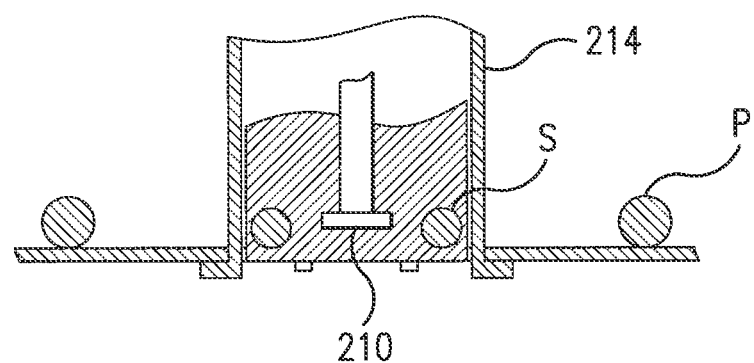
FIG. 13b illustrates a modification of FIG. 13a including a through-hull penetrator member.
Figure 13C:
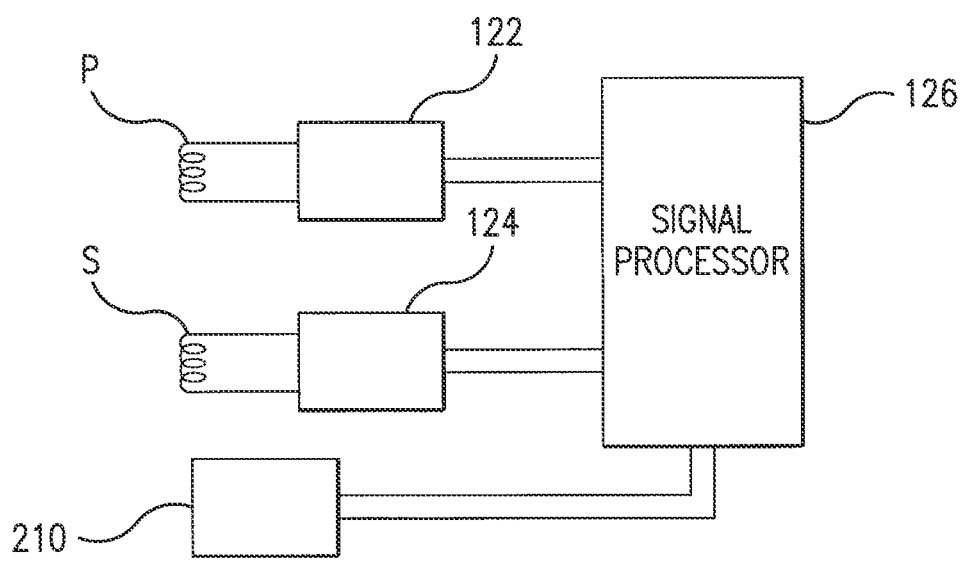
FIG. 13c is a detailed block diagram illustrating the manner of energizing the Hall effect device.

FIGS. 13a-13c illustrate how a Hall effect device is used to maintain the desirable magnetic field strength in the vicinity of the secondary coil. Because the primary coil P and the secondary coil S are often in separate housings, the distance of each coil from the hull/water interface can vary between boat styles and configurations. In particular, the thickness of a boat's hull varies between boat sizes and manufacturers. This variation in coil placement causes variation in the coil's magnetic field strength at the hull/water interface as well as throughout the energized volume of water. Since the correction factor applied by the secondary coil depends on the knowledge of the field strength of the primary coil, it is important to measure the field strength of each of the two coils. This is accomplished most easily by installing a Hall effect device 210 in a position that is coaxial with both coils.

FIG. 13a shows the general location of a Hall effect device 210 in the instant invention, and FIG. 13b illustrates a specific embodiment where the Hall effect device 210 is located on the removable support member 212 arranged in the through-hull penetrator member 214. Here the Hall effect device 210 is placed at the bottom of the support member along with the secondary coil S.

FIG. 13c illustrates how the Hall effect device 210 is integrated into the magnet drive circuitry. Here, the Hall effect device supplies to the signal processor 126 a signal that is representative of the strength of the local magnetic field. When used with embodiments that energize the two coils alternately as in FIGS. 8a-8c, the near hull signal obtained from the secondary coil S is adjusted according to the relative magnet field strengths of the two coils prior to applying the corrective adjustment. When used in the embodiment where the two coils are driven simultaneously, and in opposition, as in FIGS. 2a-2c, the amount of "destructive interference" of the two fields near the secondary electrodes in controlled by adjusting one of the two fields, whereby the desired amount of "destructive interference" minimizes the flow signals generated near the hull.

While in accordance with the provisions of the Patent Statutes the preferred forms and embodiments of the invention have been illustrated and described, it will be apparent to those skilled in the art that changes may be made without deviating from the invention described above.

What is claimed is:

1. An electromagnetic boat speedometer for measuring the velocity of a boat having a longitudinal axis travelling in a body of water, comprising (a) a velocity signal generating assembly removably mounted in an opening in a hull of the boat and having an axis extending normal to a plane containing the hull, said assembly including first and second pairs of spaced electrodes in contact with the body of water when said electrodes are in an operating position, said electrode pairs being arranged transversely relative to each other, one of said pairs being arranged parallel to the longitudinal axis of the boat;

(b) a primary electromagnetic coil arranged in the boat and coaxial with said velocity signal generating assembly;

(c) a first energizing device connected with said primary electromagnetic coil to establish a primary electromagnetic field having an axis that extends perpendicular to the hull plane within a first volume of water adjacent to the velocity signal generating assembly, said first and second pairs of electrodes generating a water velocity signal that is a function of the longitudinal and transverse velocity components of the hull travelling in the body of water within said first volume of water;

(d) a secondary electromagnetic coil separate from said primary electromagnetic coil arranged in the boat and coaxial with said velocity signal generating assembly;

(e) a second energizing device separate from said first energizing device connected with said secondary electromagnetic coil to establish a secondary electromagnetic field having an axis that extends perpendicular to the hull plane within a second volume of water which is within and less than said first volume of water to compensate for variations in water velocity in a boundary layer of water within said second volume of water immediately adjacent the hull; and (f) a signal processing device connected with said first and second energizing devices to control the activation thereof for velocity signal detection and for boundary layer compensation and with said pairs of electrodes to process said water velocity signal and generate an output indicative of the speed of the boat.

2. An electromagnetic boat speedometer as defined in claim 1, wherein said primary and secondary coils are energized simultaneously in opposition, such that the secondary electromagnetic field produced by said secondary coil opposes the primary electromagnetic field produced by said primary coil and creates an area of destructive interference where an electromagnetic field contained within said second volume of water is substantially null.

3. An electromagnetic boat speedometer as defined in claim 1, wherein said primary coil is annular and arranged coaxially in concentrically spaced relation about said secondary coil.

4. An electromagnetic boat speedometer as defined in claim 1, wherein said primary and secondary coils are alternately energized, thereby to produce velocity resultant signals that are a function of said primary and secondary electromagnetic fields, respectively; and further comprising a boundary layer modifying device connected with said signal processing device for modifying said primary electromagnetic field resultant signals by said secondary field resultant signals, thereby to produce boundary layer modified resultant water velocity signals.

5. An electromagnetic boat speedometer as defined in claim 1, wherein said signal processing device includes a Hall effect device mounted on the hull adjacent said secondary coil, said Hall effect device being connected to supply to said signal processing device a signal that is a function of the strength of said secondary field.

6. An electromagnetic boat speedometer as defined in claim 1, wherein said velocity signal generating assembly includes a tubular hull penetrator and a cylindrical support member mounted for sliding movement within said penetrator, said first and second pairs of electrodes being mounted on a lower end of said support member.

7. An electromagnetic boat speedometer as defined in claim 1, wherein said secondary electromagnetic coil is smaller than said primary electromagnetic coil in at least one of diameter and number of turns to establish said secondary electromagnetic field in said second volume of water less than said first volume of water.

8. An electromagnetic boat speedometer as defined in claim 4, and further including an adjusting arrangement for supplying to said boundary layer modifying device an adjusting signal responsive to factory set values.

9. An electromagnetic boat speedometer as defined in claim 4, and further including a second modifying arrangement for modifying the output signals of said boundary layer modifying device in accordance with control signals based on a user-generated field calibration look-up table.

10. An electromagnetic boat speedometer as defined in claim 6, wherein said secondary coil is mounted concentrically about said penetrator; and further wherein said primary coil is annular and is arranged in concentrically spaced relation about said secondary coil.

11. An electromagnetic boat speedometer as defined in claim 6, wherein said secondary coil is mounted on said support member for removal relative to said penetrator.

12. An electromagnetic boat speedometer as defined in claim 10, wherein said primary coil has a diameter of about 7 inches and is formed from 700 turns of #32 wire; and further wherein said secondary coil has a diameter of about 2.5 inches and is formed from 700 turns of #34 wire.

13. An electromagnetic boat speedometer as defined in claim 11, wherein said primary coil is annular and is secured to an upper interior surface of the boat hull concentrically about said penetrator.

14. An electromagnetic boat speedometer as defined in claim 11, wherein said primary coil comprises a helical winding provided with a ferromagnetic core, said primary winding being mounted on said support member on the opposite side of said secondary coil from the water.

15. An electromagnetic boat speedometer as defined in claim 11, wherein said primary coil has a diameter of about 7 inches and is formed from 700 turns of #32 wire; and further wherein said secondary coil has a diameter of about one inch, and is formed from 380 turns of #34 wire.

16. An electromagnetic boat speedometer as defined in claim 14, and further including a non-ferromagnetic spacer member arranged in said penetrator between said primary coil and said secondary coil.

17. An electromagnetic boat speedometer as defined in claim 14, wherein the helical winding of said primary coil has a diameter of about 1 inch, a length of about 3 inches, and is formed from 3000 turns of #31 wire; and further wherein said secondary coil has a diameter of about 1 inch, and is formed from 1000 turns of #34 wire.

18. An electromagnetic boat speedometer as defined in claim 16, wherein said electrodes, said primary coil, said secondary coil, and said spacer member are removable as a unit from said penetrator.

19. An electromagnetic boat speedometer as defined in claim 18, wherein said primary coil has a diameter of about 1 inch, a length of about 3 inches, and is formed from 3000 turns of #31 wire; and further wherein said secondary coil has a diameter of about 1 inch and a length of about 0.5 inches, and is formed from about 1000 turns of #34 wire.

20. An electromagnetic boat speedometer for measuring the velocity of a boat having a longitudinal axis travelling in a body of water, comprising
(a) a velocity signal generating assembly removably mounted in an opening in a hull of the boat and having an axis extending normal to a plane containing the hull, said assembly including first and second pairs of spaced electrodes in contact with the body of water when said electrodes are in an operating position, said electrode pairs being arranged transversely relative to each other, one of said pairs being arranged parallel to the longitudinal axis of the boat;
(b) a primary electromagnetic coil arranged in the boat and coaxial with said velocity signal generating assembly;
(c) a first energizing device connected with said primary electromagnetic coil to establish a primary electromagnetic field having an axis that extends perpendicular to the hull plane within a first volume of water adjacent to the velocity signal generating assembly, said first and second pairs of electrodes generating a water velocity signal that is a function of the longitudinal and transverse velocity components of the hull travelling in the body of water within said first volume of water;
(d) a secondary electromagnetic coil arranged in the boat and coaxial with said velocity signal generating assembly;
(e) a second energizing device connected with said secondary electromagnetic coil to establish a secondary electromagnetic field having an axis that extends perpendicular to the hull plane within a second volume of water which is within said first volume of water to compensate for variations in water velocity in a boundary layer of water within said second volume of water immediately adjacent the hull;
(f) a signal processing device connected with said first and second energizing devices to control the activation thereof for velocity signal detection and for boundary layer compensation and with said pairs of electrodes to process said water velocity signal and generate an output indicative of the speed of the boat; and
(g) a second set of second electrodes removably mounted in at least one opening contained in the hull, respectively, the tips of said second electrodes extending into said first volume of water in concentrically spaced relation around said second volatile of water, a first pair of said second electrodes being arranged in transversely spaced relation relative to the longitudinal axis of the boat, and a second pair of said second electrodes being arranged in longitudinally spaced relation relative to the longitudinal axis of the boat.

21. An electromagnetic boat speedometer as defined in claim 20, wherein said primary coil is annular, said secondary coil being annular, smaller than, and concentrically arranged within, said primary coil; and further wherein said second set of electrodes is arranged between said primary coil and said secondary coil.

22. An electromagnetic boat speedometer as defined in claim 21, wherein said primary coil has a diameter of about 7 inches and is formed by 700 turns of #32 wire; and further wherein said secondary coil has a diameter of about 2.5 inches and is formed from 700 turns of #34 wire.

\* \* \* \* \*